United States Patent
Barnes

(10) Patent No.: US 10,322,922 B2
(45) Date of Patent: Jun. 18, 2019

(54) LIFTING VEHICLE INCORPORATING A LOAD MONITOR

(71) Applicant: ABBEY ATTACHMENTS LIMITED, Bury, Lancashire (GB)

(72) Inventor: Christopher Tom Barnes, Bury (GB)

(73) Assignee: ABBEY ATTACHMENTS LIMITED, Bury, Lancashire (GB)

(*) Notice: Subject to any disclaimer, the term of this patent is extended or adjusted under 35 U.S.C. 154(b) by 0 days.

(21) Appl. No.: 15/565,744

(22) PCT Filed: Apr. 15, 2016

(86) PCT No.: PCT/GB2016/000082
§ 371 (c)(1),
(2) Date: Oct. 11, 2017

(87) PCT Pub. No.: WO2016/166500
PCT Pub. Date: Oct. 20, 2016

(65) Prior Publication Data
US 2018/0072549 A1   Mar. 15, 2018

(30) Foreign Application Priority Data

Apr. 16, 2015 (GB) .................................. 1506438.9

(51) Int. Cl.
*B66F 17/00* (2006.01)
*B66F 9/075* (2006.01)
(Continued)

(52) U.S. Cl.
CPC .............. *B66F 17/003* (2013.01); *B66F 9/07* (2013.01); *B66F 9/0755* (2013.01); *B66F 9/082* (2013.01);
(Continued)

(58) Field of Classification Search
CPC ........ B66F 17/003; B66F 9/07; B66F 9/0755; B66F 9/082; B66F 9/22; G01G 19/083; G01G 19/12
See application file for complete search history.

(56) References Cited

U.S. PATENT DOCUMENTS 4,093,091 A * 6/1978 Gregg .................... B66F 17/003
212/278
4,231,450 A * 11/1980 Hedtke ................. B66F 17/003
180/282

(Continued)

FOREIGN PATENT DOCUMENTS

| GB | 1510292 A | 5/1978 |
|---|---|---|
| GB | 1590440 A | 6/1981 |
| JP | 2000044196 A | 2/2000 |

OTHER PUBLICATIONS

International Search Report for corresponding International Application No. PCT/GB2016/000082.

*Primary Examiner* — Hongmin Fan
(74) *Attorney, Agent, or Firm* — Egbert Law Offices, PLLC

(57) ABSTRACT

A lifting vehicle has a lifting device movably mounted on a mast. Raising and lowering of the lifting device is controlled by a lift cylinder. A load monitor including a strain gauge is mounted on a bridge that is secured at each end to locations that are either on the chassis or on the mast. An indicator in communication with the load monitor can signal an output to an operator of the vehicle. As the strain gauge is secured to a load-stressed part of the vehicle, the load monitor is able to measure the stress being imposed on the vehicle. However, as the locations to which the ends of the bridge are secured are static with respect to one another, the readings (Continued)

are not distorted by torsional and shear forces. This enables the weight of a load and also the stability of the vehicle as a whole to be judged.

13 Claims, 7 Drawing Sheets

(51) Int. Cl.
  *B66F 9/08* (2006.01)
  *B66F 9/07* (2006.01)
  *B66F 9/12* (2006.01)
  *G01G 19/12* (2006.01)
  *G01L 1/22* (2006.01)
  *G07C 5/08* (2006.01)
  *G08B 3/00* (2006.01)

(52) U.S. Cl.
  CPC ............. *B66F 9/122* (2013.01); *G01G 19/12* (2013.01); *G01L 1/2262* (2013.01); *G07C 5/085* (2013.01); *G08B 3/00* (2013.01)

(56) References Cited

U.S. PATENT DOCUMENTS

| | | | |
|---|---|---|---|
| 4,942,529 A * | 7/1990 | Avitan | B66F 9/24 340/685 |
| 6,302,419 B1 * | 10/2001 | Ito | B60G 9/02 280/124.111 |
| 2011/0118903 A1 * | 5/2011 | Kraimer | B60R 21/0132 701/2 |
| 2015/0167662 A1 * | 6/2015 | Hatch | F04B 51/00 417/53 |
| 2016/0187210 A1 * | 6/2016 | Coleman | G01G 19/083 73/862.639 |

\* cited by examiner

LIFTING VEHICLE INCORPORATING A LOAD MONITOR

The present invention relates to a lifting vehicle, in particular a forklift truck, that incorporates a load monitor to assist in reduction of the risk of overloading and tip-over accidents occurring.

In order to use a lifting vehicle such as a forklift truck safely the capacity of the vehicle needs to be considered at all times. The capacity of the vehicle is determined by the weight of the load to be carried, the centre of gravity of the load and its distance from the front face of the lifting platform or forks (the load centre) and the height of the load. Conventional lifting vehicles often incorporate a load monitor in their forks or secured to their lifting platform that measures the bending force in the forks or platform caused by the weight of the load. The monitor relays this information to the cab of the vehicle in order that the driver can be alerted when the vehicle is likely to be overloaded.

However, another consideration that needs to be taken into account with regard to the stability of the vehicle is the tilt angle of the mast of the vehicle. This is often not taken into account when rating lifting vehicles and is not measured by conventional load monitors but it is an important consideration because when the mast of the vehicle tilts forwards, the load centre increases. Overall, the various conditions that may cause a lifting vehicle to tip forwards are as follows.
1. If the weight of the load is greater than that of the counterweight carried by the vehicle at its rear the vehicle will tip forwards.
2. It the weight of the load is within safe limits given the weight of the counterweight but the load centre is too far forwards, the moment of the load may overcome the counterbalance effect of the counterweight.
3. It the weight of the load is within safe limits but the tilt angle of the load is too far forwards, the moment of the load may again overcome the counterbalance effect of the counterweight.

GB1510292 describes a load-handling vehicle, fail-safe overload protective system for preventing a load being handled by the vehicle from imparting an excessive tilting moment to the vehicle likely to cause the vehicle to overturn. The vehicle comprises a sensor including a plurality of strain gauges that are mounted externally on a tilt anchor pin of a tilt jack used to maintain a mast of the vehicle in a desired upright condition. This arrangement has the disadvantage that the sensor measures stresses in the tilt anchor pin, which include torsional and shearing forces created when the vehicle articulates. These forces are not responsible for causing tip-over accidents. In addition, the sensor changes position as the pins change direction. As resistance strain gauges such as those described in GB 1510292 are more sensitive to strain in a vertical direction than in a horizontal direction, changes in the direction of the gauge owing to tilting of the pin introduce inaccuracies into the readings taken by the sensor that also affect the determination of whether the vehicle is liable to overturn.

GB1590440 describes a load handling vehicle comprises a split chassis articulated about a vertical axis at a point between the axles of the vehicle and a superstructure with a lifting member cap able of raising a load and placing it at a distance from the vehicle. Such vehicles are usually termed articulated forklift trucks. This vehicle comprises a strain gauge that is mounted at the vertical pivot connecting the two parts of the chassis in order that strains are detected due to the superstructure and the load. An audible and/or visible alarm is operable by the strain gauge mechanism to give warning when the strains are such as to render the vehicle unstable. This arrangement again mounts the strain gauge on a pin that is subject to torsional and shearing forces thereby introducing inaccuracies into the measurements taken.

In both of the aforementioned conventional arrangements, the strain gauges do not measure stresses in the vehicle chassis or its mast directly and detect torsional and shearing forces that distort the reading of forces that should be measured to determine whether the vehicle is overloaded or liable to tip over.

It is an object of the present invention to provide a lifting vehicle with a load monitor that issues an appropriate warning to an operator of the vehicle, which can take into account all of the aforementioned conditions and overcome the aforementioned disadvantages of conventional arrangements.

According to the present invention there is provided a lifting vehicle comprising
a lifting device movably mounted on a mast secured to a chassis of the vehicle, raising and lowering of the lifting device on the mast being controlled by a lift cylinder and tilting of the mast forward and backward out of a vertical position being controlled by a tilt cylinder that is mounted by fastenings between a part of the chassis and the mast;
a load monitor comprising a strain gauge mounted on a bridge that is secured at each end to locations that are either on said part of the chassis or on the mast adjacent the fastening for the tilt cylinder; and
an indicator in communication with the load monitor that can signal an output of the load monitor to an operator of the vehicle;
characterised in that the locations on said part of the chassis or on the mast to which the ends of the bridge are secured are static with respect to one another.

It will be appreciated that as the or each strain gauge is secured to a part of the vehicle which is stressed by the loads being carried, the load monitor is able to measure the stress being imposed on the chassis or mast of the vehicle directly. This enables not only to the weight of the load to be detected but also the stability of the vehicle as a whole to be determined uncontaminated by directional, torsional or shearing forces. The arrangement is therefore much reliable than conventional arrangements.

Preferably, said fastenings are clevis fastenings and the bridge is secured to said part of the chassis or the mast that is adapted to form part of one of said clevis fastenings.

Preferably also, the bridge is secured to at each end either to said part of the chassis or the mast by studs that are stud welded to said part of the chassis or the mast.

Preferably also, the strain gauge comprises a resistive strain gauge.

Other preferred but non-essential features of the various aspects of the present invention are described in the dependent claims appended hereto.

The present invention will now be described by way of example with reference to the accompanying drawings, in which.

Figure 1:
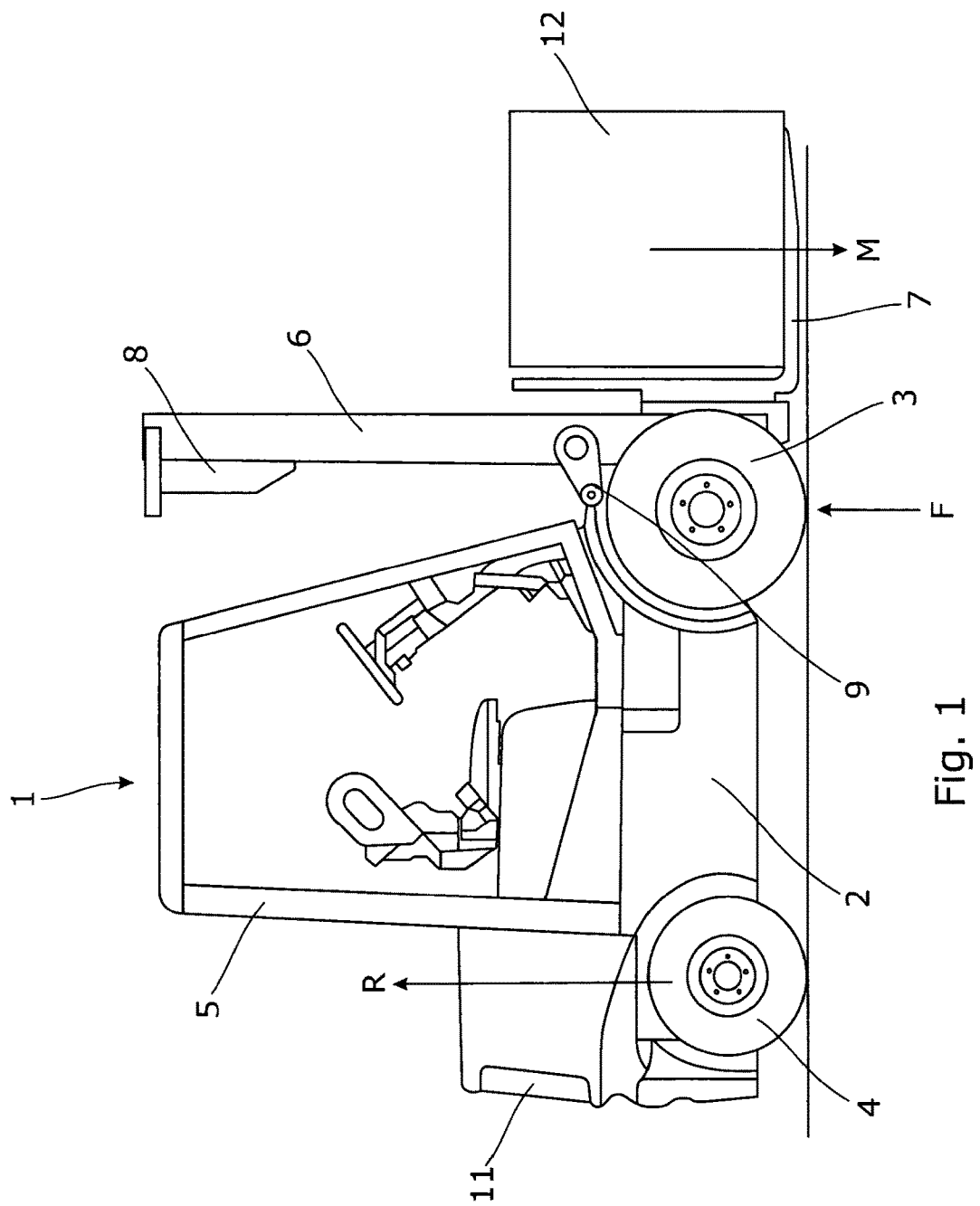
FIG. 1 is a schematic drawing of a lifting vehicle.
Figure 6:
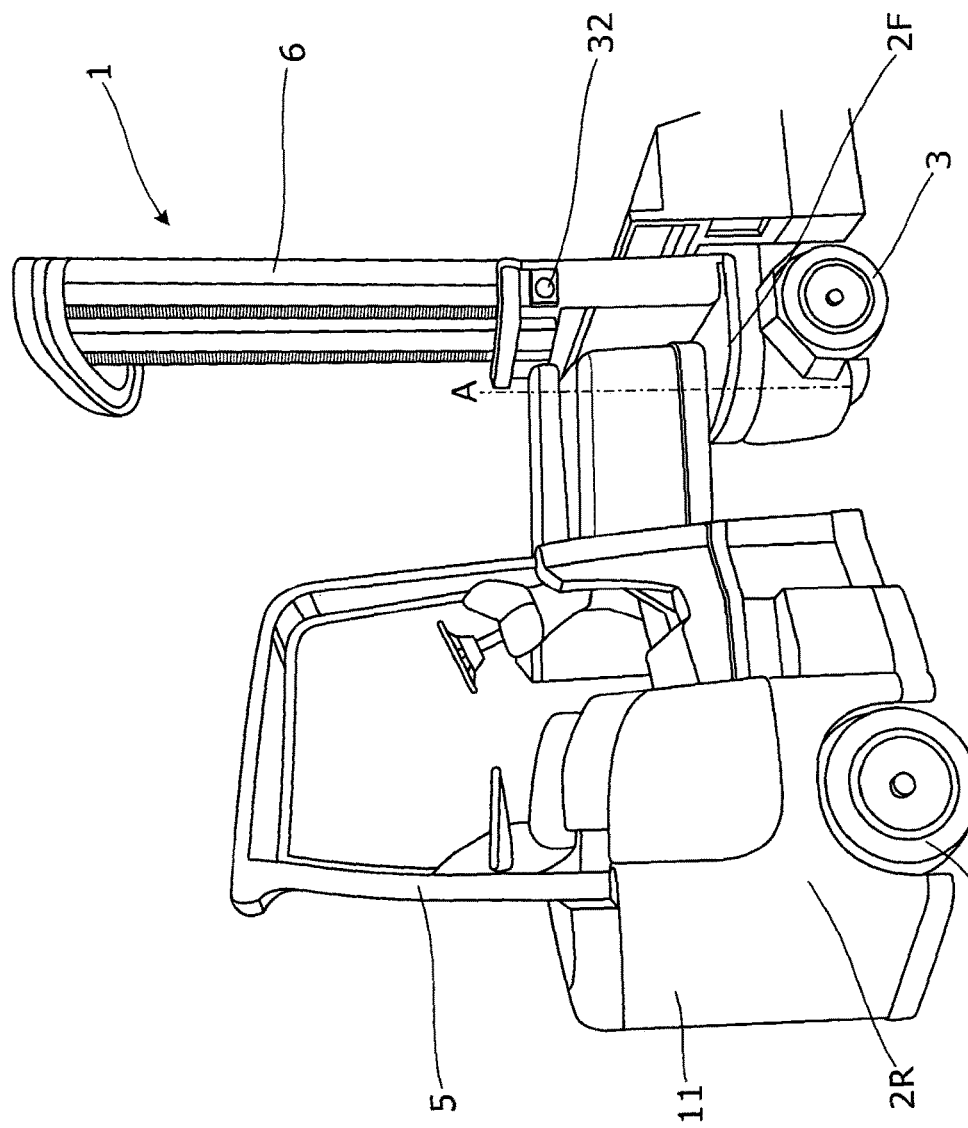
FIG. 6 is a schematic drawing of an articulated lifting vehicle.

A lifting vehicle 1 such as a forklift truck as shown in FIGS. 1 and 6 comprises a chassis 2 carried by front wheels 3 and rear steering wheels 4. Mounted on the chassis 2 are a cab 5 for an operator and a mast 6. A lifting device, for example lifting forks 7 or in other embodiments of the invention a lifting platform, is mounted on the mast 6. Raising and lowering of the lifting forks 7 is controlled by a lift cylinder 8 mounted on the mast 6. Tilting of the mast 6 and thereby the lifting forks 7 forward and backward out of a vertical position is controlled by a pair of tilt cylinders 9 located on opposite sides of the mast 6 respectively, each of which cylinders 9 is mounted between a part 10 of the chassis 2 and the mast 6. At the rear of the vehicle 1 is a counterweight 11. The truck shown in FIG. 6 differs from that shown in FIG. 1 in that it is an articulated forklift truck wherein the chassis 2 is split, a front part 2F carrying the lifting device including the mast 5 and forks 7 is articulated about a vertical axis A to a rear part 2R carrying the cab 5 and counterweight 11.

With reference to FIG. 1, it will be appreciated that all moment forces M applied to the mast 6 by a load 12 carried by the lifting forks 7 are transmitted to the chassis through the tilt cylinders 9. The front wheels 3 act as a fulcrum F with the resulting force R being applied over the rear wheels 4 of the vehicle 1. This resulting force R must be overcome by the counterweight 11 that is mounted above the rear wheels 4 if the vehicle is to be prevented from tipping over forwards. Hence, by monitoring the moment force M, an indication can be given to an operator of the vehicle of the safety of the vehicle given the size of load 12.

Figure 2:
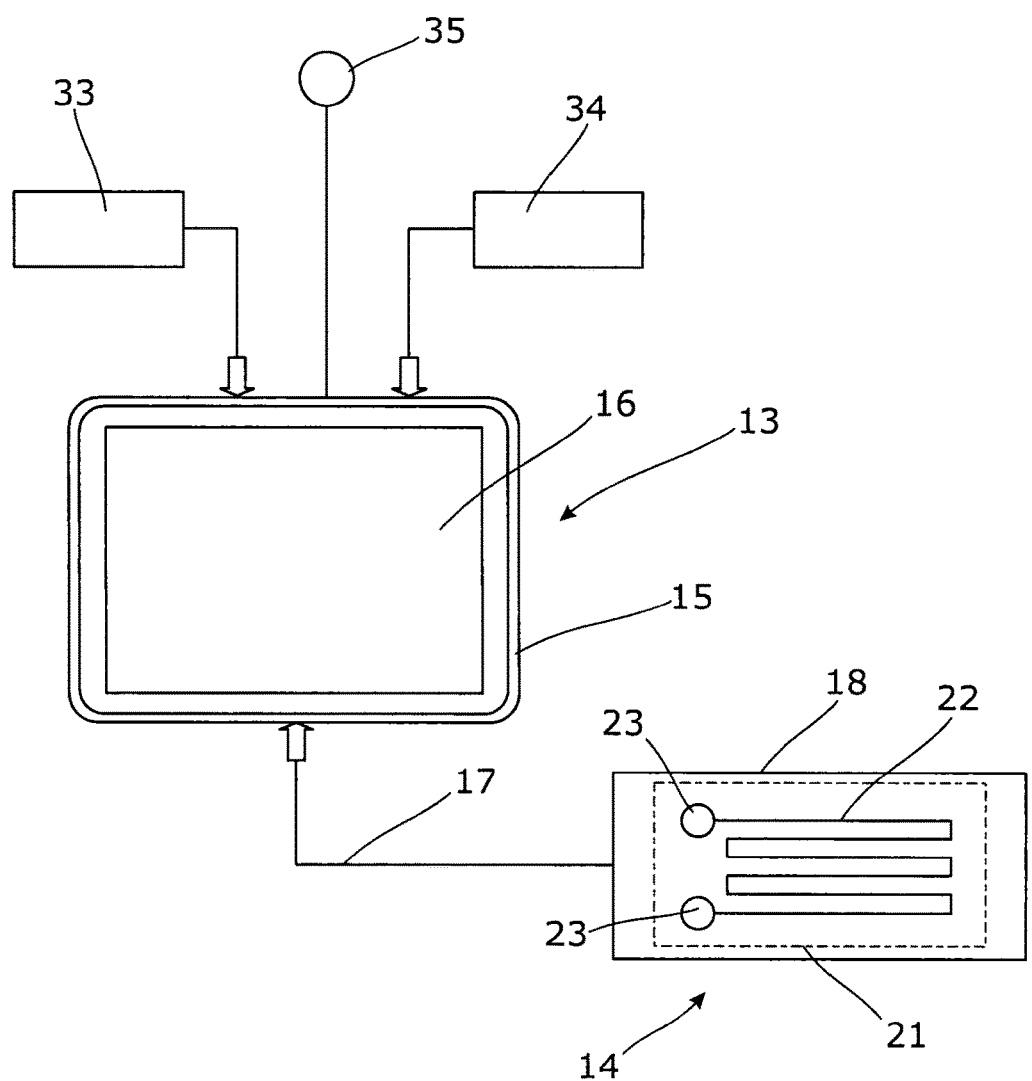
FIG. 2 is a schematic drawing showing a load monitor and an accompanying indicator.
Figure 3:
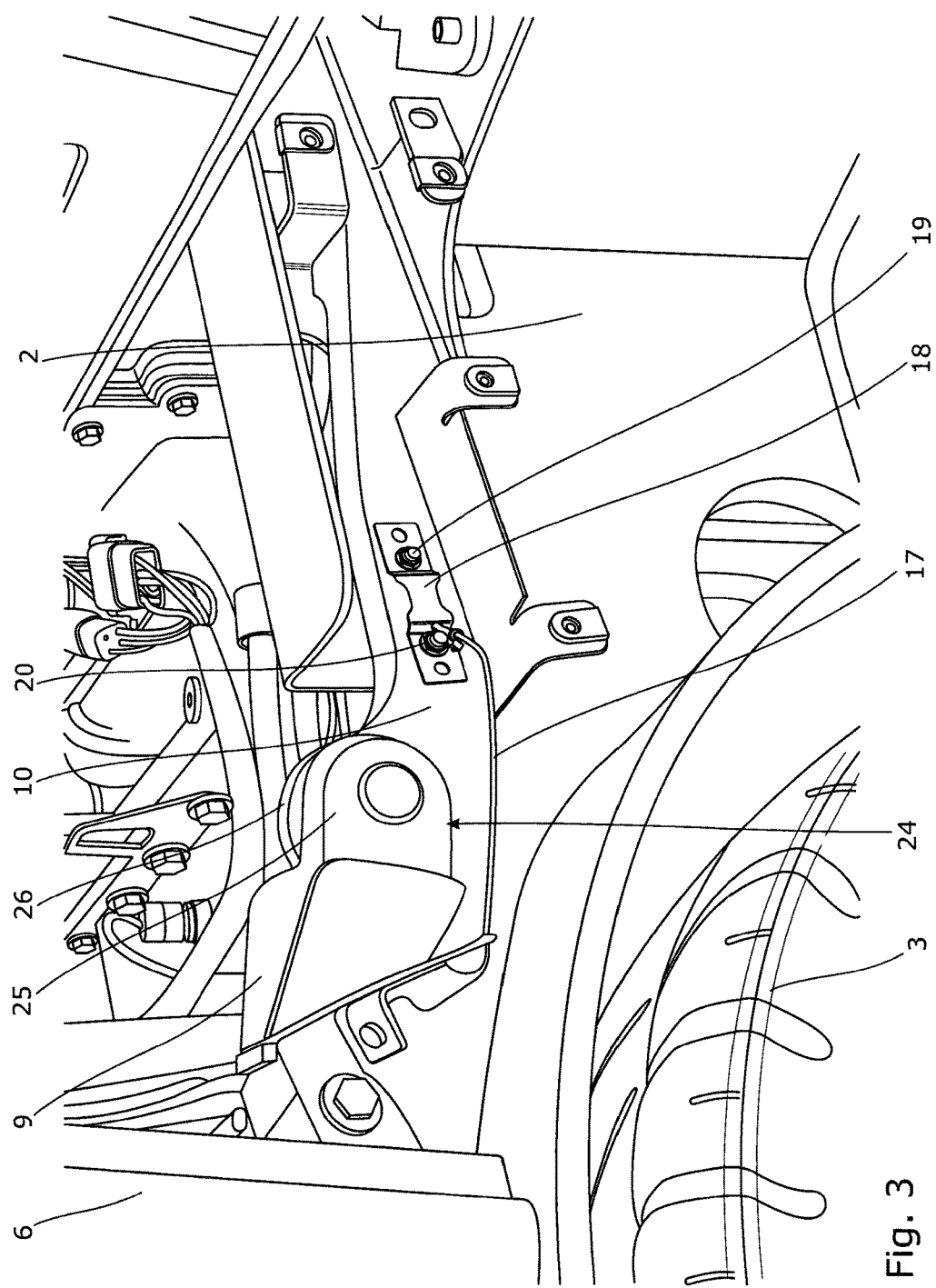
FIG. 3 shows to an enlarged scale a part of a vehicle as shown in FIG. 1 that carries a strain gauge and bridge in accordance with the present invention.
Figure 4:
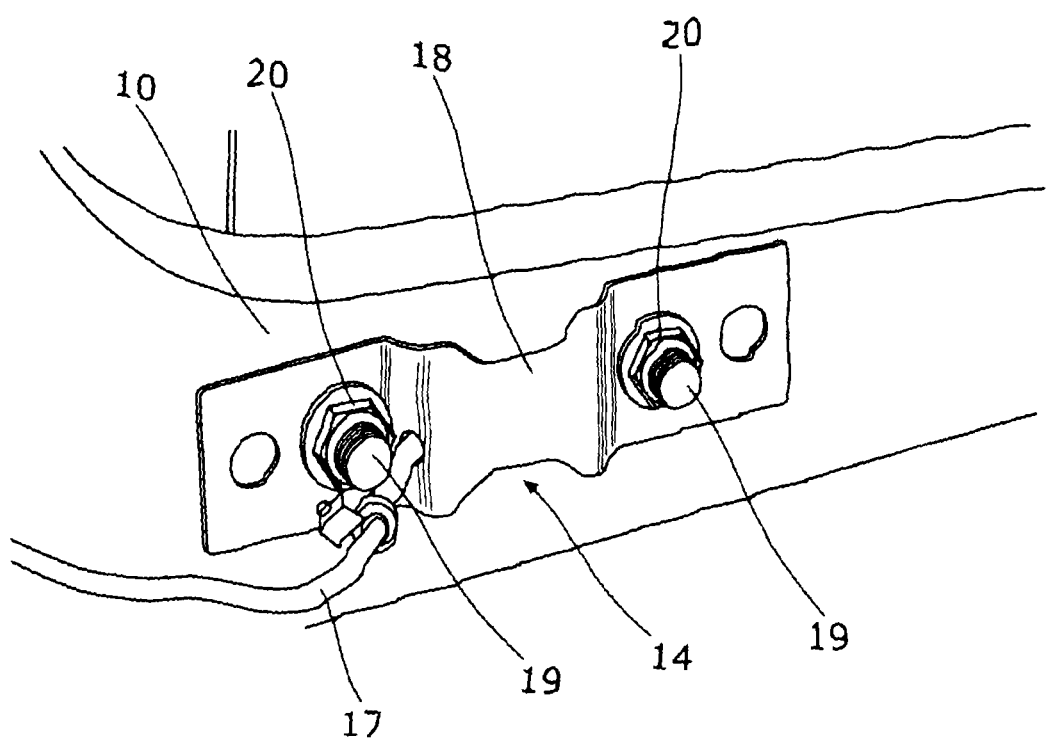
FIG. 4 is a view to an enlarged scale of the bridge shown in FIG. 3.
Figure 5:
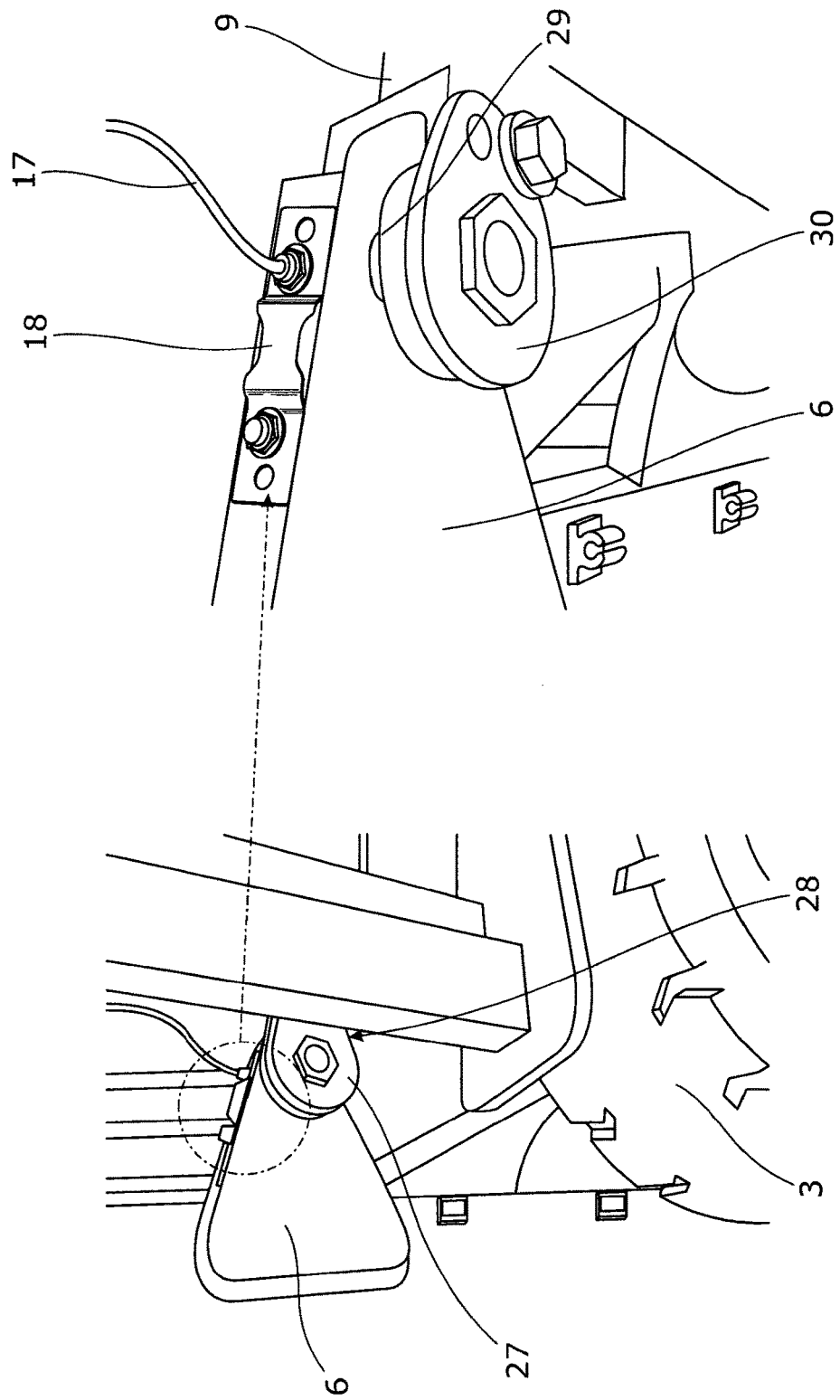
FIG. 5 shows to an enlarged scale another part of the vehicle shown in FIG. 1 that carries a strain gauge and bridge in accordance with the present invention, an enlarged scrap view showing the mounting of the bridge in more detail.
Figure 7:
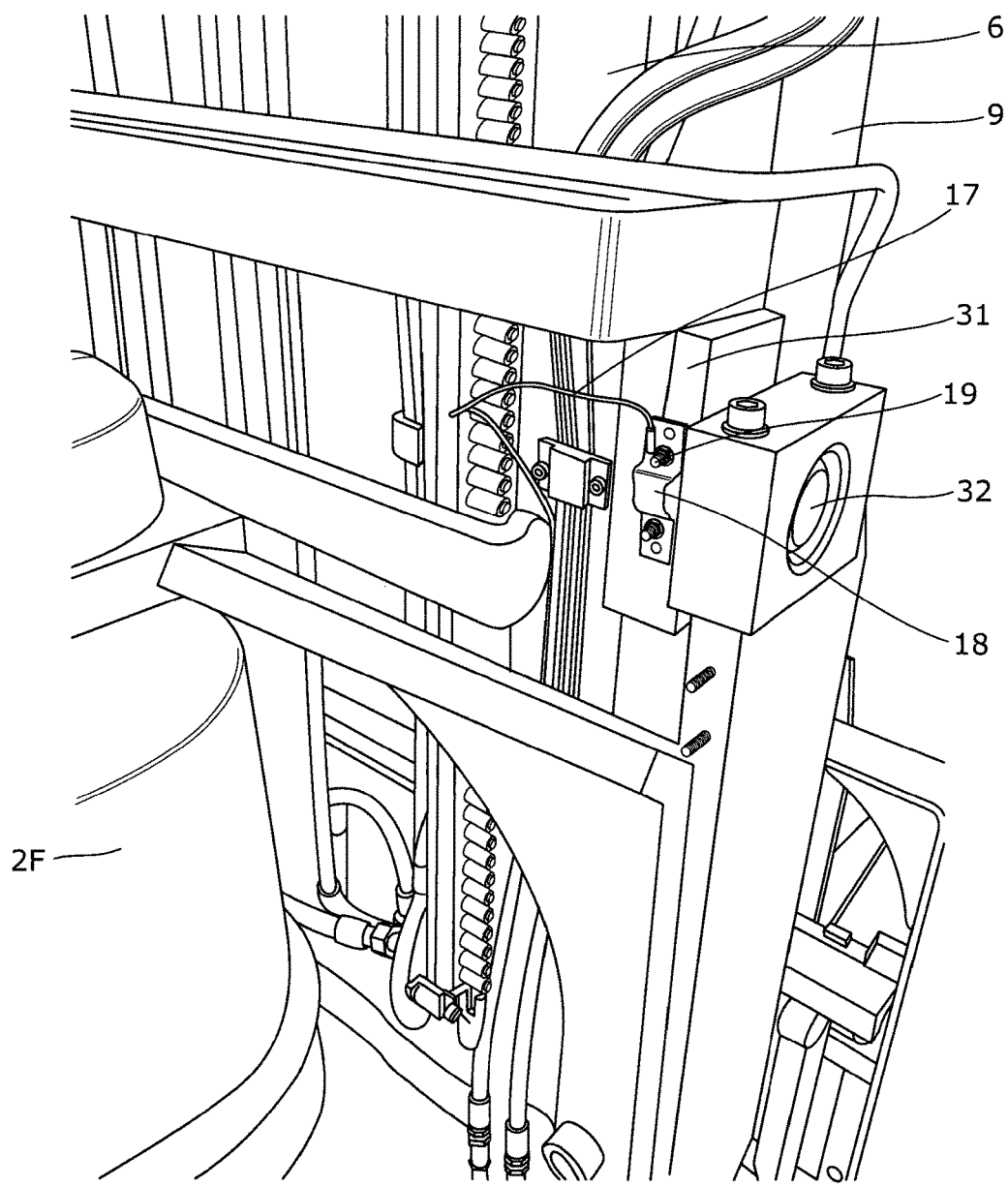
FIG. 7 shows to an enlarged scale a part of a vehicle as shown in FIG. 6 that carries a strain gauge and bridge in accordance with the present invention.

In the present invention, the moment force is monitored by a load monitor 13 that comprises one and preferably two strain gauges 14 linked to a processor 15 and indicator 16, typically a display screen, by wiring 17 as shown in FIG. 2. The strain gauges 14 are preferably resistive strain gauges and are each mounted on a bridge 18 secured at each end to locations that are either on that part 10 of the chassis 2 adjacent the mounting of one end of the tilt cylinders 9, as shown in FIGS. 3 and 4, or alternatively on the mast 6 at positions adjacent to the mounting of the other end of the tilt cylinders 9, as shown in FIGS. 5 and 7. These locations, that is those on the part 10 of the chassis 2 or on the mast 6, are static with respect to one another. This is described in more detail below. However, in both cases the bridge 18, which is typically of steel, is attached to the vehicle 1 via studs 19 that are secured to the vehicle by preferably by stud welding, advantageously by capacitor-discharge stud welding. This is a non-destructive mode of attachment that does not weaken the underlying structure of the vehicle 1. It also enables the load monitor 13 along with its accompanying indicator 16 to be retrofitted to an existing lifting vehicle. The bridges 18 are fastened to the studs 19 by nuts 20. However, other fixation methods can be used to attach the bridge 18. For example, the bridge 18 could be bonded directly to the vehicle 1 but this would have to take place in a controlled environment and require micro-electronic work. Another fixation method is by drilling and tapping mounting holes but this would weaken the underlying structure if the bridge 18 is being retro-fitted to an existing vehicle and could only practically be used by a manufacturer of the vehicle 1 when the holes could be taken into account when designing the vehicle 1.

The strain gauge 14 carried by each bridge 18 is preferably a conventional resistive strain gauge that comprises an insulating flexible backing sheet 21 supporting a metallic foil pattern 22 that is adhered to the bridge 18 between the studs 19. Two terminals 23 at the end of the foil pattern 22 are connected to the wiring 17 and thereby to the processor 15. The processor 15 and indicator 16 are mounted in the cab 5 of the vehicle and powered by their own batteries or by attachment to the battery of the vehicle 1. Prior to use the arrangement is calibrated using a load 12 with a known load centre with the mast 6 in a vertical position. Thereafter, when in use the part 10 of the chassis 2 or the mast 6 is put under strain it distorts slightly, this also distorts the bridge 18 which in turn distorts the metallic foil pattern 22. Distortion of the metallic foil pattern 22 causes its electrical resistance to change. This resistance change, usually measured using a Wheatstone bridge arrangement, is related to the strain by a known quantity known as the gauge factor. The processor 15 is programmed to interpret the changes in resistance of the metallic foil pattern 22 and to display the result on the indicator 16. The indicator 16 can thereby indicate to an operator of the vehicle 1 when the vehicle is either overloaded or loaded such that it is liable to tip should the lifting forks 7 be used to raise the load 12 beyond a threshold level or the mast 6 tipped forwards beyond a given angle.

The location of the bridges 18 with their attached strain gauges 14 will now be described in more detail.

In one arrangement as shown in FIGS. 3 and 4, the bridge or the bridges 18 are secured to at each end to the parts 10 of the chassis 2 adjacent the mounting of one end of the tilt cylinders 9. These parts 10 of the chassis 2 at the ends of each bridge 18 are static with respect to one another. In the case when two bridges 18 are used this will be to the parts 10 on opposite sides of the vehicle 1 respectively. Each tilt cylinder 9 is mounted to the chassis 2 by a clevis fastening 24 and the parts 10 of the chassis 2 are those parts 10 that are adapted to form one piece of each of the clevis fastenings, that is either the delis 25 or a tang 26 that fits within the clevis. In the arrangement shown in FIG. 3 the part 10 is adapted to form the tang 26, the tilt cylinder 9 being connected to the clevis 25. Hence the part 10 will be put under direct strain by the tilt cylinder 9 when the vehicle 10 is in use.

In an alternative arrangement as shown in FIG. 5, the bridge or bridges 18 are secured to the mast 6 adjacent to the mounting of the other ends 27 of the tilt cylinders 9. Here again the tilt cylinders 9 are secured to the mast 6 by clevis fastenings 28 and the mast 6 is adapted to form one piece of each of the clevis fastenings 28. In the illustrated arrangement the mast 6 is adapted to form a tang 29 that is fitted between a clevis 30 secured to the end 27 of the tilt cylinder. Each bridge 18 is attached to the tang 29 as shown in more detail in the enlarged detail forming part of FIG. 5. It will be seen that the locations to which the ends of the bridge 18 are secured are static with respect to one another.

In the articulated vehicle shown in FIGS. 6 and 7, the ends of the bridge 18 are secured to a part 31 of the mast 6 adjacent its pivot 32 such that the bridge 18 straddles the centre line of the pivot 32. As before, the locations to which the ends of the bridge 18 are secured are, however, static with respect to one another. The bridge 18 is secured adjacent to that part 31 of the mast that is adapted to form a tang of a clevis fastening forming the pivot 32. This enables the strain gauge 14 to measure load forces tending to stretch the mast 6 about the pivot 32.

In use, the present invention enables the indicator 17 to display to an operator of the invention a more complete picture of the effects caused by loading the vehicle 1 with a given load. Unlike prior art arrangements which only measure the weight and load centre of the load and those which are distorted by torsional and shear forces, the stress to the vehicle directly and solely caused by the tilt angle of the mast 6 and the lift height is measured. This is because the locations to which the ends of the bridge 18 of the strain gauge 14 are secured are static with respect to one another so that the readings taken by the strain gauge 14 are not distorted by torsional and shear forces. In addition, unlike many conventional arrangements which are secured to the lifting forks or lifting platforms of lifting vehicles, the present invention is chassis based. This greatly reduces the cost of the invention. This is because lifting forks and platforms wear in use and are replaced many times during the life of a vehicle. Load monitors secured to the lifting forks or platforms therefore have to be replaced at the same time, significantly increasing the cost of replacement. However, the present invention does not need to be replaced once fitted when the lifting forks or platform are replaced. Finally, the load monitor and indicator arrangement of the present invention can be readily retrofitted to any existing lifting vehicle. In this regard although the description above describes the invention in relation to a forklift vehicle it will be appreciated that it can be applied to any appropriate lifting vehicle including lifting trolleys and the like.

In some embodiments, the vehicle 1 may incorporate one or more hydraulic pressure transducers installed in the hydraulic circuitry for the lift and tilt cylinders 8 and 9 and linked to the processor 15 in order to provide data to enable the processor 15 to calculate the weight of load 12 carried by the vehicle 1. For example, a hydraulic transducer 33 (see FIG. 2 for a schematic arrangement) may be provided that is used to measure the hydraulic pressure within the hydraulic hose supplying hydraulic pressure to the lift cylinder 8. The readings taken by the transducer 33 are relayed to the processor 15, which uses them to calculate the weight of the load 12. Similarly, a further transducer 34 may also be provided to measure the hydraulic pressure within the hydraulic hose supplying hydraulic pressure to the tilt cylinder 9 so that the moment M from both load centre position and mast tilt can be taken into account. The weight of the load 12 may then be displayed on the indicator 16. As the processor 15 will then be aware when there is no load 12, this can be used to zero the readings from the strain gauge 14, making the arrangement self-calibrating. Also, as the measured hydraulic pressure is affected by the ambient temperature the processor 15 may be programmed to use feedback readings from the strain gauge or strain gauges 14 to take into account temperature changes in the hydraulic pressure so that the arrangement is aware when a vehicle is driven from one environment to another with a considerably different ambient temperature, for example driving a vehicle from the interior of an building outside, where the temperature may be considerably warmer or colder.

Preferably, the processor 15 is used to continuously calculate the stability of the vehicle 1 and to weigh the load 12. These data are preferably continuously displayed on the indicator 16 in a format and colour that can be taken in at a glance, for example graphically and in red or green. An audible alarm 35, such as a buzzer, is also preferably linked to the processor 15 or to the indicator 16 to sound an alarm if an overload or near-tipping condition occurs. The processor 15 may also be adapted to log information and to transfer it, for example by a wireless network to a remote device.

The invention claimed is:

1. A lifting apparatus comprising:
    a vehicle having a chassis;
    a lifting device movably mounted on a mast secured to the chassis;
    a lift cylinder cooperative with said lifting device so as to control a raising and a lowering of said lifting device on the mast;
    a tilt cylinder mounted by a fastening between a portion of the chassis and the mast, said tilt cylinder cooperative with the mast so as to control a tilting of the mast forward and backward of a vertical position;
    a load monitor comprising a strain gauge mounted on a bridge that is secured at each end thereof to location that are either on the portion of the chassis or on the mast adjacent to the fastening for the tilt cylinder; and
    an indicator in communication with said load monitor, said indicator adapted to signal an output of said load monitor to an operator of said vehicle, wherein the locations on the portion of the chassis or on the mast to which the ends of the bridge are secured are static with respect to each other.

2. The lifting apparatus of claim 1, wherein the fastening comprises clevis fastenings, the bridge forming a portion of one of the clevis fastenings.

3. The lifting apparatus of claim 2, wherein the portion of the chassis or the mast forms a tang of the one of clevis fastenings.

4. The lifting apparatus of claim 1, wherein the bridge is secured at each end by studs that are stud welded to the portion of the chassis or the mast.

5. The lifting apparatus of claim 4, wherein the stud welding is capacitor-discharge stud welding.

6. The lifting apparatus of claim 1, wherein said tilt cylinder comprises a pair of tilt cylinders located respectively on opposite sides of the mast, each of the pair of tilt cylinders having the strain gauge mounted adjacent to the fastening so as to form a portion of said load monitor.

7. The lifting apparatus of claim 1, wherein the strain gauge is a resistive strain gauge.

8. The lifting apparatus of claim 7, wherein the resistive strain gauge comprises an insulating flexible backing sheet supporting a metallic fail pattern, the backing sheet being adhered to the bridge.

9. The lifting apparatus of claim 1, wherein the strain gauge is attached by wiring to a processor, the processor being in communication with said indicator so as to process data from the strain gauge in order to determine a stability of said vehicle.

10. The lifting apparatus of claim 9, each of said lift cylinder and said tilt cylinder having hydraulic circuitry, wherein at least one hydraulic pressure transducer is installed in the hydraulic circuitry and linked to the processor so as to provide data to the processor to enable the processor to calculate a weight of a load carried by said vehicle.

11. The lifting apparatus of claim 10, wherein the processor is adapted to use the data from the hydraulic pressure transducer to zero readings from the strain gauge.

12. The lifting apparatus of claim 9, further comprising:
    an audible alarm linked to the processor or to said indicator.

13. The lifting apparatus of claim 9, wherein the processor is adapted to log information and to transfer the information by a wireless network to a remote device.

\* \* \* \* \*